2 Sheets—Sheet 1.
F. J. MARTINS.
Automatic Pendulum Regulator.
No. 208,620. Patented Oct. 1, 1878.
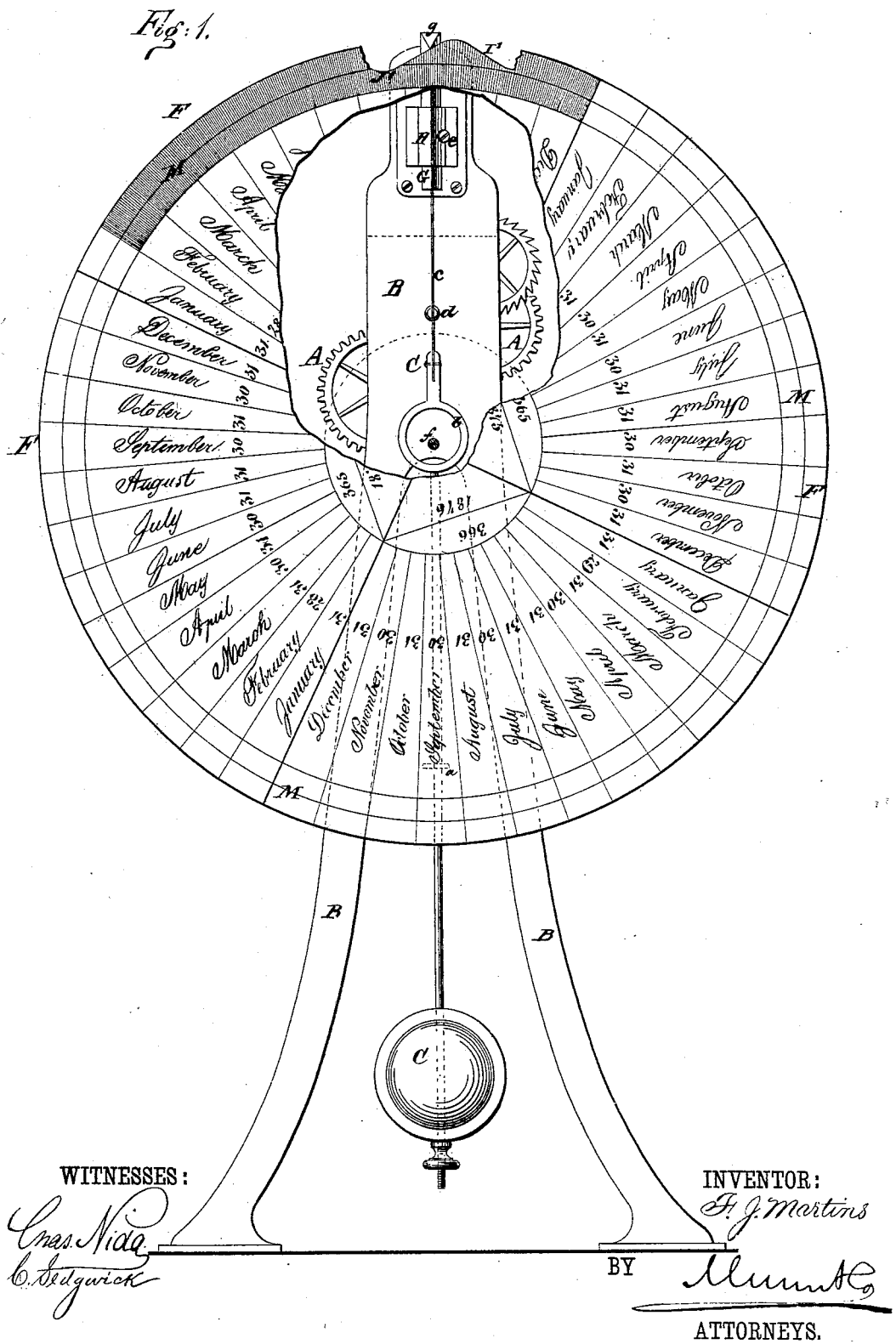

F. J. MARTINS.
Automatic Pendulum Regulator.
No. 208,620. Patented Oct. 1, 1878.
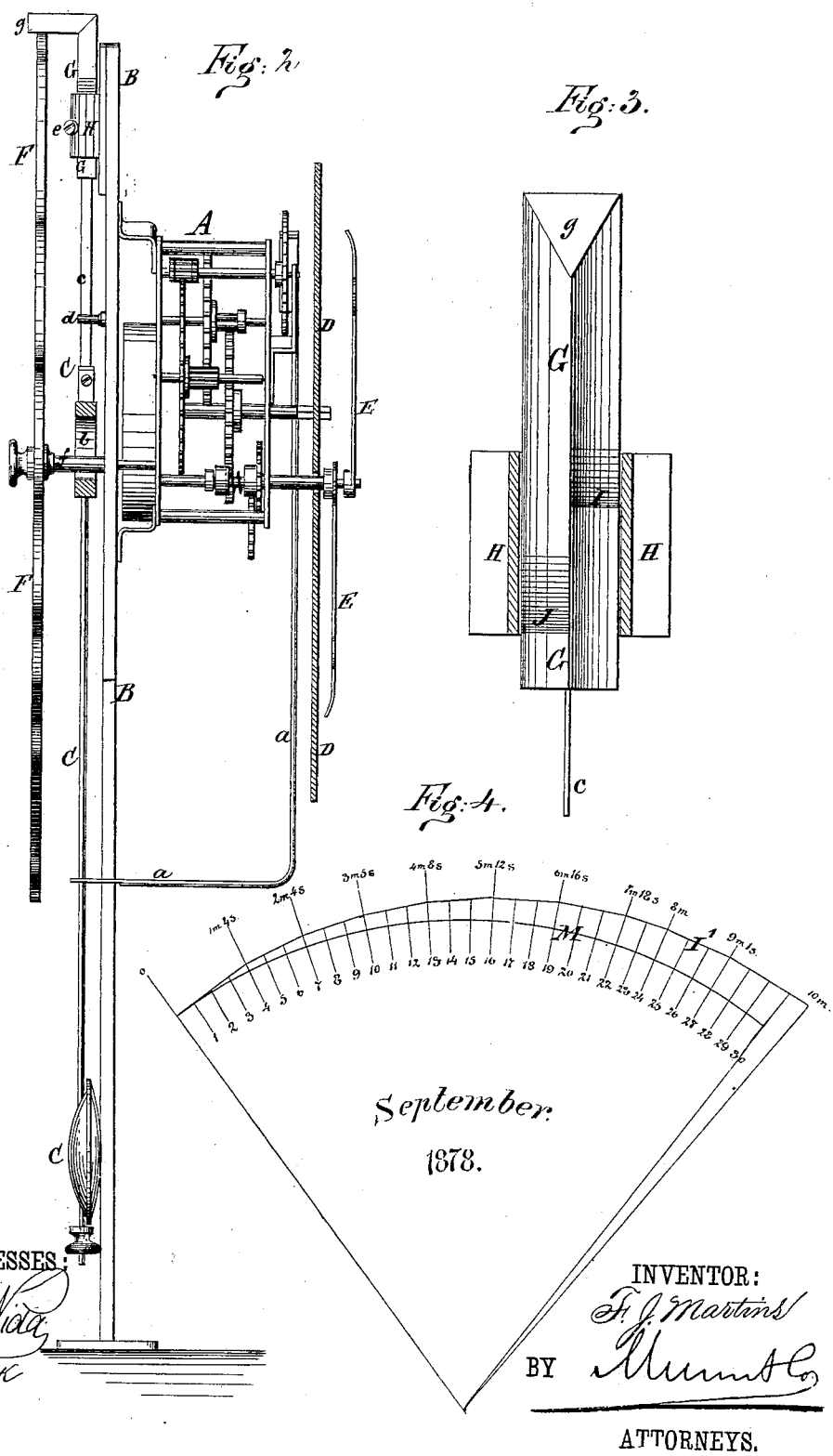

UNITED STATES PATENT OFFICE.

FRANCISCO J. MARTINS, OF PARÁ, BRAZIL.

IMPROVEMENT IN AUTOMATIC PENDULUM-REGULATORS.

Specification forming part of Letters Patent No. 208,620, dated October 1, 1878; application filed January 21, 1878.

*To all whom it may concern:*

Be it known that I, FRANCISCO JOSÉ MARTINS, of the city of Pará, in the Province of Pará, Brazil, have invented a new and useful Improvement in True-Time Regulators, of which the following is a specification:

The object of my invention is to provide a new method and device whereby an ordinary clock may be made to indicate the apparent or true solar time.

The invention consists in the combination, with a sliding pendulum, of a regulating cam-wheel, the edge of which projects beyond and withdraws within a true circle in correspondence with the increase and the decrease of the true time from the mean time, as will be hereinafter described.

In the accompanying drawing, Figure 1, Sheet 1, represents a face view of my improved true-time regulator applied to a clock-work constructed to indicate the usual mean solar time. Fig. 2, Sheet 2, is an edge view of the same. Figs. 3 and 4, Sheet 2, are enlarged details.

Similar letters of reference indicate corresponding parts.

The ordinary clocks are made to indicate the mean time, according to which, with uniform velocity of the earth, the sun should pass the meridian always at twelve o'clock, as would be the case if the sun were in the extended equatorial plane. But the sun being in the plane of the ecliptic, and the velocity of the earth varying with the different seasons and proximities to the sun, the time at which the sun does pass the meridian occurs sometimes before and sometimes after 12 o'clock, noon, with a regularly decreasing or increasing variation, the greatest difference between the apparent or true solar time and the mean solar time being about sixteen minutes and forty-five seconds. In order, therefore, to indicate the true time, an ordinary clock must be automatically regulated to run faster or slower, according to the equation of time, or difference between the mean time and the true time.

The velocity of a clock-work being proportional to the number of oscillations in a given time of the pendulum, and these again being dependent on the length of the pendulum, it is evident that the object sought will be accomplished by automatically regulating the length of the pendulum of a correct mean-time clock according to the equation of time. This is effected by the present invention.

A is an ordinary clock-work, attached to a frame, B, and the escapement of which is connected by the forked rod $a$ to the pendulum C, in the usual manner. D is the dial of the clock. E are the hands for indicating hours and minutes. F is the regulating-wheel for automatically adjusting the length of the pendulum, in the perpendicular line of which it is pivoted on the stud $f$.

In order to allow of free oscillation and vertical adjustment of the pendulum C, the lower part of the latter is connected with the upper part or spring $c$ by the ring $b$, surrounding the stud $f$, the opening in the ring $b$ being sufficiently large to allow free movements of the pendulum C without coming in contact with the stud $f$. In order to make the adjustment of the pendulum C extremely sensitive, I do not vary its length by raising or lowering the weight by the screw at its lower end, in the usual manner; but I cause it to oscillate from the stud $d$, secured to the frame B, the said stud $d$ being slotted to receive, with a tight fit, the spring $c$, by sliding which up and down in the slotted stud $d$ the length of the oscillating part of the pendulum C is accordingly varied. The upper end of the spring $c$ of the pendulum C is secured to a prismatic rod, G, which is fitted to slide in a suitable guide-plate, H, on the frame B. The sliding rod G is provided with a prismatic or V-shaped arm, $g$, which is at a right angle to the rod G, and a part thereof.

The sliding rod G is secured in any position in the guide-plate H by the set-screw $e$, for temporarily retaining a given length of the pendulum while ascertaining the variation in length required to effect a certain variation in time. If, now, the edge of the wheel F be cut into the shape of a correct diagram of the equation of time, and the arm $g$ of the sliding rod G of the pendulum C be allowed to ride on the edge of the wheel F, while the latter is revolved with the proper velocity, it is evident that the length of the pendulum will be varied continuously according to the equation of time, and the clock will indicate the true solar time instead of the mean time.

The regulating-wheel F is constructed as follows: As the equation of time is exactly the same for every fourth year, and the sun passes the meridian once a day, I divide the circumference of a wheel, F, of suitable size, into one thousand four hundred and sixty-one equal spaces, being the number of days in four years. The surface of the wheel is then divided into four quarters, or one for each of the four years, in such a manner that, of the one thousand four hundred and sixty-one divisions, three hundred and sixty-five are allotted to each of the three-quarters and three hundred and sixty-six for the fourth quarter, according to the number of days in each ordinary year and in the leap-year. Each quarter is then divided into twelve spaces for the months of the year, according to the correct number of days in each month, as is shown in Fig. 1, where the wheel has been marked with the years 1875 to 1878, inclusive.

M is the circle on the wheel F, which represents the mean or ordinary time, because if the arm $g$ of the sliding rod G were allowed to travel continuously on the circle M, the length of the pendulum would not vary. When the true time is ahead of the mean time the pendulum should be raised above the circle M, and thus shortened, and when the true time is behind the mean time the pendulum should be lowered below the circle M, and thus lengthened. The curve for increase of velocity must thus lie outside of the circle M, and the curve for decrease of velocity must lie inside of the said circle M.

The construction of the diagram will be understood with reference to Fig. 4, in which the space of one month in Fig. 1 is drawn to a large and practical scale.

I have chosen the month of September as best fit for illustration, because during that month the true time is gradually increasing its velocity ahead of the mean time at the rapid rate of from 6.52 seconds to ten minutes. By raising the sliding rod G and keeping it temporarily secured by the set-screw $e$, to ascertain the proper decrease of the length of the pendulum to correspond with an increased velocity of one, two, and so forth, up to seventeen minutes of the true time above the mean time, and marking each observation by a line at the upper edge of the guide-plate H, I form on the sliding prism G a scale, I, of minutes, (and fractions thereof.) In the same manner I take observations of the proper increase of the length of the pendulum to correspond with a decreased velocity of one, two, and so forth, up to seventeen (or a sufficient number of) minutes, and form, in like manner, by marking at the lower edge of the guide-plate H, the scale J. I then set off on the radial lines, Fig. 4, marked with the dates of the month, on the outside of the mean circle M, the distance in the scale I which corresponds with the equation of time, or difference in minutes, according to the maritime almanac. Thus, for instance, on the fourth, seventh, tenth, &c., line for the days of the month, I set off from the scale I, respectively, one minute and four seconds, two minutes and four seconds, three minutes and five seconds, &c., and connect by lines the points marked. The curve I thus formed is the part of the diagram of the equation of time for the month of September.

The curve I will continue to ascend up to November 3, when it will again descend to reach the mean circle M at the end of the space for December. The true time will thereafter fall short of the mean time, with a gradually-increased difference during January and the first half of February, when it will gradually again ascend toward the mean circle M. The curve J' below the circle M is found by setting off in the radial lines inside the circle the measures from the scale J corresponding to the differences in minutes found in the table of equation of time for the different dates, and connecting the points thus found in the same manner as in constructing the curve I'.

The wheel F is connected by suitable gearing to the clock-work, and caused to make one complete revolution in four years.

To adjust the wheel F in its right position, it is only necessary to turn it until the edge of the arm $g$ comes on the line corresponding with the actual date at the time of such adjustment.

I do not limit myself to the exact form of any of the parts here shown, as they may be varied without departing from my invention.

Having thus described my invention, what I claim as new, and desire to secure by Letters Patent, is—

In combination with the sliding pendulum C, a regulating cam-wheel, F, the edge of which projects beyond and withdraws within a true circle, M, in correspondence with the increase and the decrease of the true time from the mean time, substantially as and for the purpose set forth.

FRANCISCO JOSÉ MARTINS.

Witnesses:
  A. W. ALMQVIST,
  C. SEDGWICK.